United States Patent [19]

Soltys

[11] 4,192,686

[45] Mar. 11, 1980

[54] COMPOSITIONS AND METHOD FOR INHIBITING FORMATION OF EXPLOSIVE COMPOUNDS AND CONDITIONS IN SILVERING CONCENTRATES FOR ELECTROLESS DEPOSITION OF SILVER

[75] Inventor: Joseph F. Soltys, London, Canada

[73] Assignee: London Laboratories Limited Co., Woodbridge, Conn.

[21] Appl. No.: 840,840

[22] Filed: Oct. 11, 1977

[51] Int. Cl.$^2$ ................................................ C23C 3/02
[52] U.S. Cl. ................................. 106/1.23; 427/165; 427/168; 427/443.1
[58] Field of Search ............... 106/1.23; 427/164, 165, 427/168, 169, 430 A

[56] References Cited

U.S. PATENT DOCUMENTS 3,983,266  9/1976  Bahls ................................. 427/164

Primary Examiner—Lorenzo B. Hayes
Attorney, Agent, or Firm—DeLio and Montgomery

[57] ABSTRACT

Potentially explosive mixtures which can form as a result of accidental contact between a concentrated aqueous solution of ammoniacal silver salt and a concentrated solution of a strong alkali are inhibited in an improved multi-part system for electroless deposition of silver on an activated surface by simultaneous admixture of the diluted parts thereupon. Accordingly, an improved method for inhibiting formation of explosive conditions and compounds in a mixture formed by contacting concentrated aqueous ammoniacal silver salt and a concentrated solution of alkali is provided, whereby an effective amount of an explosion inhibitor is provided either in combination with the ammoniacal silver salt, in which case sufficient extraneous ammonium ions are provided to stabilize the explosion inhibitor, or in the strong alkali, or a portion of the explosion inhibitor is provided in each of said ammoniacal silver salt and strong alkali. Conventional reducers for ammoniacal silver salt can be utilized together with said explosion inhibitor.

31 Claims, No Drawings ic silver salt or the strong alkali to facilitate shipment and handling because the reducer would reduce the ammoniacal silver salt to elemental silver, with formation of non-explosive compounds, so that the silver would not be available at the desired time and place for the desired electroless deposition reaction.

COMPOSITIONS AND METHOD FOR INHIBITING FORMATION OF EXPLOSIVE COMPOUNDS AND CONDITIONS IN SILVERING CONCENTRATES FOR ELECTROLESS DEPOSITION OF SILVER

BACKGROUND

This invention relates to the inhibition of formation of explosive compounds and conditions which can result from contacting concentrates of ammoniacal silver salts and strong alkali, which are normally utilized in dilute form, in simultaneous admixture with a reducer to effect electroless deposition of silver. A serious and inherent hazard encountered in shipment and use of ammoniacal silver salts, particularly in concentrated forms, is the danger of accidental or negligent admixture or contacting of the ammoniacal silver composition with a strongly alkaline material or a concentrated alkali solution, for example sodium hydroxide, potassium hydroxide or the like.

It is well known that upon such contact, without suitable safeguards or inhibitors, explosive conditions and compounds, often referred to as fulminating silver, can form and result in detonation, which can be quite violent and dangerous. This hazard is particularly prevalent in situations where for reasons of economy and commericial preferences many industrial firms utilizing these materials utilize concentrated solutions involving separate shipment and handling of the materials. Although the risk of formation of explosive compounds or conditions upon inadvertent or accidental admixture could be minimized by use and shipping of dilute solutions of ammoniacal silver salts and strong alkali, or by carefully controlling the admixture of the same together with a reducer to effect the desired electroless deposition, the safety hazard still remains, since shipping and plant personnel may not be fully informed regarding the dangers and human error is an ever present factor in any industrial endeavor.

It has long been known in the art that metallic silver can be electrolessly deposited by appropriate use of combinations of (1) ammoniated silver salts, hereinafter also referred to as "ammoniacal silver salts", (2) strong alkali, (i.e. metal hydroxides of Group IA which are strong electrolytes) such as sodium hydroxide or the like and (3) a reducer for the ammoniacal silver salts, such as carbohydrates, e.g. invert sugar, formaldehyde or the like, as well as more recently developed reducers such as aldonic acids and polyhydric alcohols, which will be discussed hereinafter in greater detail. It was soon discovered that explosions could occur with detonation resulting from even very slight mechanical or thermal stimulus in a mixture which could result from contacting concentrates of ammoniacal silver salts and strong alkali.

In the prior art it was recognized that such explosions were produced from reactions between silver diammine and hydroxyl ions, when brought into contact in aqueous solution. These ions are believed to react to first form silver amide, then silver imide and finally silver nitride. These substances are all black and rather insoluble in aqueous solution.

Of the foregoing compounds, the nitride is the most unstable and is capable of spontaneous explosion, as well as detonation upon the slightest mechanical or thermal stimulation, with the silver imide readily detonated by the explosion of the silver nitride. It is also known that formation of these explosive compounds is promoted by high alkalinity in the reaction medium and by increases in temperature. While it is possible to minimize the formation of such explosive compositions and conditions by maintaining either or both of the ammoniacal silver salt and a strong base in a highly diluted state, such dilute concentrations are not commercially economical, particularly with regard to the shipment of the materials from the supplier to the end user who utilizes the same to deposit metallic silver.

The sensitivity to explosion of the mixture formed by contacting an ammoniacal silver salt and strong caustic varies with time and temperature. However, it has been found that at normal room temperature, the critical concentration below which explosion is generally not likely to occur is about 45 g/l each of ammoniacal silver salt and strong alkali. Typical concentrates supplied for commercial use contain 250 g/l of ammoniacal silver and 200 g/l of sodium hydroxide, so that these materials must be diluted 5.5 and 4.4 times, respectively, in order to reach the 45 g/l critical level. Even at this critical level there would be no guarantee that explosion will not occur if the materials were admixed. Thus, further dilution would be recommended to provide a margin of safety. Such further dilution would be utterly impractical, however, because of high cost of transportation of the same weight of chemicals in up to ten times the amount of water now generally used.

Commercially, industrial use of ammoniacal silver salts and strong alkali is directed to concentrates of such solutions, which, if contacted, would result in a mixture having a concentration of perhaps 5 to 10 times the aforementioned critical concentration of avoidance of explosion simply on the basis of dilution. Accordingly, these solutions are manufactured, shipped, stored and handled in concentrated form until such time as they are prepared for appropriate reaction by simultaneous admixture to effect electroless deposition of silver on an appropriate work-piece surface.

In the event that ammoniacal silver salt and strong alkali are brought into contact in a mixture in which they are present above the aforementioned critical concentration, formation of explosive compounds and conditions can occur spontaneously, or over varying degrees of time, depending upon the resulting hydroxyl ion concentration (pH), the concentration of silver diammino ion and the temperature. For example, if one cc each of a 250 g/l solution of ammoniacal silver nitrate and a 200 g/l solution of sodium hydroxide are admixed, a black precipitate forms rapidly and a sharp explosion sufficient to disintegrate a test tube containing the mixture will occur rapidly, depending upon temperature.

Accordingly, there is substantial need for improved methods and compositions which will inhibit formation of such explosive compounds and conditions and allow concentrates of such solutions to be safely shipped, stored and utilized without risk of explosion.

The earliest known reducers for the electroless deposition of silver, e.g. carbohydrates, such as invert sugar, dextrose, fructose or arabinose will prevent formation of explosive compounds and conditions when admixed with an ammoniacal silver salt and strong alkali, because the silver salt is rapidly reduced to elemental silver and other non-explosive compounds. However, such reducers cannot be made available in the reaction medium by first being admixed with either the concentrated ammoniacal silver salts or the strong alkali, because such reducers in the presence of hydroxyl ions are catalytically converted to non-reducers and/or, in the presence of ammoniated silver, produce amounts of reduced silver sludge, only minute quantities of which would render the solution commercially unfit.

However, in U.S. Pat. No. 3,776,740 of Sivertz et al and Canadian Pat. No. 945,307 a method for electroless deposition of silver and method for inhibition of the formation of fulminating silver are disclosed, utilizing a class of reducing agents comprising aldonic acids having 4 to 7 carbon atoms. The preferred reducers disclosed by Sivertz et al are gluconic acid, sodium gluconate, sodium glucoheptonate or glucono-delta-lactone. This class of reducers, it was disclosed, could be included either with the ammoniacal silver salt, with the strong alkali, or a portion of the reducer with each of the concentrated solutions of ammoniacal silver salt and strong alkali. These reducers were found to be not only useful for deposition of metallic silver upon simultaneous combination of the solutions containing ammoniacal silver salts and strong alkali, respectively, but they were also found to have other properties, not in any known way related to their reducing capabilities, namely to resist the action of hydroxyl ions to destroy their effectiveness as reducers of silver ions. These reducers are also stable in combination with each of the various components.

As further disclosed in Canadian Pat. No. 945,307, this class of reducers, as a result of being stable in both concentrated solutions of ammoniacal silver salts and strong alkali could be added to the same to inhibit the formation of explosive fulminating silver upon accidental or inadvertent contacting, because the presence of the reducer would cause the silver salts to be rapidly reduced, thereby avoiding formation of explosive compounds or conditions in the mixture.

U.S. Pat. No. 3,983,266 discloses the utility of a broad class of polyhydric alcohols having from 3 to 8 carbon atoms as reducers of ammoniacal silver salts. The preferred polyhydric alcohol is sorbitol. However, while U.S. Pat. No. 3,983,266 recognized that such polyhydric alcohols could be used as reducers for ammoniated silver, its use as disclosed in that patent was specifically restricted to the long prior-established techniques for old conventional reducers, such as glucose, which required that such reducers must be applied from separate containers and in streams of spray entirely separate from the alkali and ammoniated silver. Accordingly, one skill in the art was taught by this patent that three concentrates were to be used, one of which was ammoniated silver, one sodium hydroxide and one reducer. Consequently, they would know that it was still necessary to deal most cautiously with the first two members of the three-part system, which are well known to be capable of producing explosives. U.S. Pat. No. 3,983,266 refers to Sivertz U.S. Pat. No. 3,776,740 and discusses the same as prior art, yet does not disclose or suggest that its own novel polyhydric alcohol reducers could be utilized in a two-part silvering system, such as that disclosed in the Sivertz patent for use with its aldonic acid reducers. In fact, U.S. Pat. No. 3,983,266 teaches against incorporation of sorbitol in strong alkali, thus precluding use of the reducer in the manner disclosed by Sivertz et al.

The present invention is particularly directed to the situation in which, though generally accidental or inadvertent, concentrated, solutions of ammoniacal silver salt and a strong alkali come into contact, resulting in the formation of a mixture of potentially explosive compounds, such as fulminating silver, or explosive conditions. In accordance with the present invention, not only is a method for inhibiting formation of such explosive compounds and conditions provided, but also an improved multi-part silvering system utilizing ammoniacal silver and strong alkali in conjunction with a suitable conventional reducer, is provided. This multi-part silvering system is protected against the formation of such explosive compounds and conditions as a result of inadvertent or accidental contacting of the materials, no matter in what proportion the concentrated solution of strong alkali and ammoniated silver happen to be mixed.

DEFINITIONS

The following definitions are provided to assist in the understanding of the description herein and will be utilized accordingly:

"Concentrated solution" is a solution having a concentration of soluble components indicated, which concentration is greater than the concentration at which said solution is normally utilized to effect electroless deposition of silver.

"Strong alkali" refers to basic compounds formed by elements of Group IA of the Periodic Table, including but not limited to sodium hydroxide, potassium hydroxide and the like.

"Extraneous ammonium ions" and like terms refers to a source of ammonium ions other than those normally existing in ionic form in an aqueous solution of ammoniacal silver salt and refers to both ammonium ions provided from an additional source, such as by addition of an ammonium salt, or which are generated in situ as a result of effecting a change in chemical balance, pH or the like in an aqueous solution of an ammoniacal silver salt, whereby additional ammonium ions are generated therein.

"Reducer" refers to any compound which is capable of effecting reduction of ammoniacal silver salts to elemental silver to produce electroless deposition of silver.

"Fulminating silver" refers to a mixture of various forms of silver amide/imide/nitride compounds, which are explosive and susceptible to detonation by mechanical or thermal stymulus.

SUMMARY OF THE INVENTION

The present invention is predicated upon the discovery that the formation of explosive conditions and compounds in a mixture resulting from contact of a concentrated aqueous solution of ammoniacal silver salts and strong alkali can be inhibited by including an effective amount of explosion inhibitor comprising a polyhydric alcohol having 4 to 6 carbon atoms, preferably sorbitol, mannitol or xylitol. The explosion inhibitor is preferably included in the concentrated aqueous solution of ammoniacal silver salt, in which case it is necessary to also provide in the solution of ammoniacal silver salts sufficient extraneous ammonium ions to stabilize the explosion inhibitor and prevent deterioration of the solution. It is also fully within the purview of the present invention that the explosion inhibitor can, alternatively, be combined with the strong alkali solution, or that a portion of the explosion inhibitor could be combined with both the solution containing ammoniacal silver salt and the strong alkali solution.

The present invention also provides an improved multi-part silvering system for electroless deposition of silver by simultaneous admixture of the system components, wherein the system components are protected from formation of explosive compounds and conditions. The multi-part silvering system of the present invention comprises (A) a concentrated aqueous silvering solution comprising ammoniacal silver salt, (B) a concentrated aqueous solution of strong alkali and (C) an effective amount of conventional reducer for the ammoniacal silver salt, with an effective amount of an explosion inhibitor comprising a polyhydric alcohol having 4 to 6 carbon atoms, which may be either included in component (A), (B), or a portion thereof in both (A) and (B). It is within the purview of the present invention that the conventional reducer for the ammoniacal silver salt may be provided either in system component (A), (B), or a portion thereof in both (A) and (B), provided the conventional reducer is compatible therein. Furthermore, it is within the purview of the invention that if a sufficient amount of said explosion inhibitor is provided, it can also serve as reducer, so that use of other conventional reducers may not be required.

Accordingly, it is an object of the present invention to provide an improved method and compositions for inhibiting formation of explosive compounds and conditions in solutions utilized for electroless depositions of silver and, particularly, for inhibiting explosion in the concentrated forms in which the components of such multi-part systems are shipped, stored and handled.

It is a further object of the present invention to provide a safe, stable and commercially suitable multi-part system for electroless deposition of silver films of high quality and rate of production.

It is yet a further object of the present invention to provide a method whereby formation of explosive compounds and conditions which can result from contamination or inadvertent or accidental admixture of concentrates of ammoniacal silver salts with alkaline materials, which method will provide "fail-safe" protection free from maintenance or commercial difficulty.

Still a further object is to provide a method of inhibiting explosive compounds and conditions based upon an explosion inhibitor which can be made available in a strongly alkaline solution, or a concentrated solution of ammoniacal silver salt, or in both, without substantially decomposing therein or adversely effecting the operability of either as components in a multi-part system for electroless deposition of silver.

A further object of the invention is to provide a method for inhibiting formation of explosive compounds or conditions during admixture of reactants in a multi-part system for electroless deposition of silver, but without interferring with the desired reaction to effect the deposition of silver upon simultaneous admixture of the system components on a suitable surface.

Other objects and advantages of the method and compositions of the present invention will be readily apparent to those skilled in the art through study of the following description of the preferred embodiments and the appended claims.

DESCRIPTION OF THE PREFERRED EMBODIMENTS

In accordance with the present invention it has been discovered that polyhydric alcohols having 4 to 6 carbon atoms, preferably sorbitol, mannitol or xylitol, can be utilized to provide a novel and improved method and compositions for inhibiting formation of explosive conditions and compounds, frequently referred to as fulminating silver. In addition, since compounds in this class of polyhydric alcohols are known to have utility as reducers for ammoniacal silver salt in the presence of sufficient strong alkali, the invention provides a novel method and compositions whereby these materials can be utilized as reducers in a manner not previously disclosed or suggested by the prior art, with the added benefit of providing protection against the danger of explosion in the event of inadvertent or accidental contact of concentrated ammoniacal silver salt and strong alkali.

In particular, it has been discovered that the polyhydric alcohols of the invention can be combined with either concentrated ammoniacal silver salt and/or strong alkali solutions, so that their performance for purposes of electroless deposition of silver is not adversely affected and the polyhydric alcohol does not decompose or is not adversely affected in its capacity to serve as an explosion inhibitor upon simultaneous combination of the three system components; namely, the ammoniacal silver salt, the strong alkali and a conventional reducer.

In the event that a concentrated solution of ammoniacal silver salt or strong alkali, having the explosion inhibitor of the present invention present therewith, should come into contact, the materials will react to produce a colloidal material (generally referred to as "silver mud"), which, while resulting in an amorphous form rather than a crystalline form of silver, nevertheless interferes with the reactions between these materials which could lead to formation of explosive silver compounds and conditions. The reaction involving formation of the "silver mud" is preferred and occurs at a faster rate than the reactions leading to formation of explosive compounds, such as fulminating silver. Furthermore, the concentrations of ammoniacal silver salt and strong alkali are decreased by the reduction reaction either completely, or at least below the critical concentration above which explosion is likely to occur.

It has been discovered that the explosion inhibitors of the present invention are better and more efficient than the reducers disclosed in U.S. Pat. No. 3,776,740. The polyhydric alcohols utilized as explosion inhibitors are non-ionic and therefore do not act as complexing agents which can desensitize an activated glass surface, causing premature sludging, or removal of sensitizer therefrom, causing a void in the plating. Furthermore, these polyhydric alcohols are more efficient with regard to the electron transfer required for reduction of the ammoniacal silver salt, since they contain more potential free electrons than the aforesaid reducers disclosed in U.S. Pat. No. 3,776,740.

Furthermore, it has been discovered that in accordance with the invention, explosion can be effectively inhibited with substantially less polyhydric alcohol than would be expected simply to effect reduction of silver to its colloidal form, accompanied by dilution of the admixture constituents. While presently it is not fully understood why this occurs, nevertheless the phenomenon has been observed and indeed is of beneficial and advantageous utility. It makes it possible to achieve effective protection against explosion utilizing substantially less polyhydric alcohol, than would be required to utilize its reducing capability in a multi-part silvering system. Of course, it is fully within the purview of the invention that one may also add quantities of these polyhydric alcohols sufficient to also effectively reduce the ammoniacal silver to effect deposition of a silver film, as hereinafter discussed in detail.

The preferred method for inhibiting formation of explosive conditions or compounds in a mixture which could result from contact of an ammoniacal silver salt in concentrated aqueous solution and a strong alkali, comprises providing an effective amount of an explosion inhibitor comprising a polyhydric alcohol having 4 to 6 carbon atoms. The explosion inhibitor is preferably admixed with the concentrated solution of ammoniacal silver salt, preferably in conjunction with sufficient extraneous ammonium ions to stabilize the explosion inhibitor in the concentrated solution of ammoniacal silver salt. The extraneous ammonium ions may be provided either by addition of an ammonium salt, such as ammonium nitrate or ammonium citrate, as well as other ammonium salts which are compatible with the ammoniacal silver salt being used and which will not interfere with the reduction thereof to elemental silver. When ammonium nitrate is used, about 10–200 g/l and, preferably, between about 16–80 g/l should be added to the concentrated solution of ammoniacal silver salt.

It is also possible and fully within the purview of the present invention that the extraneous ammonium ions required to stabilize the explosion inhibitors of the present invention can be generated in situ, while leaving a sufficient excess of free ammonia, as required for the system of silver deposition described herein. These extraneous ammonium ions are generated in situ by addition of an acid which is compatible with the ammoniacal silver salt and will not lead to formation of precipitates with the same, nor interfere with its eventual reduction to metallic silver. Such acids include but are not limited to citric acid, tartaric acid, acetic acid, nitric acid or the like.

Without being restricted to any single mechanism or theory, since such is not yet fully understood, it is nevertheless believed that extraneous ammonium ions are generated in situ in a solution of ammoniacal silver salt by the following mechanism.

In order to prevent precipitation of silver oxides and hydroxides when the silver salt is ultimately reacted with alkali to effect electroless deposition of silver, an excess of ammonia is added to and is present in the aqueous solution of ammoniacal silver salt. Each mole of silver salt will only complex with two ammonia molecules and the remainder or excess of which is termed "free ammonia". Generally, ammoniacal silver salt solutions used commercially are provided with about 10% in excess of the free ammonia required to prevent silver oxide or hydroxide formation.

It is well known that an equilibrium is established between the ammonium ions and free ammonia, having an equilibrium constant.

$$K = \frac{[NH_4^+][OH^-]}{[NH_3^*]} = 1.8 \times 10^{-5},$$

K is the equilibrium constant, at 25° C.
$[NH_4^+]$ is the molar concentration of ammonium ions,
$[OH^-]$ is the molar concentration of hydroxyl ions, and
$[NH_3^*]$ is the molar concentration of free ammonia, which is calculated as the total ammonia added to the silver salt to form ammoniacal silver salt less 2 times the molar concentration of silver salt.

Upon admixture of an acid, as aforementioned, to a solution of ammoniacal silver salt, a corresponding molar amount of free ammonia, $NH_3^*$, will be consumed and form an ammonium acid salt, thereby increasing the concentration of ammonium ions, $NH_4^+$. Since the equilibrium constant, K, remains the same, the concentration of hydroxyl ions, $OH^-$, will decrease and effect a corresponding lowering of pH.

Alternatively, addition of extraneous ammonium ions, in the form of ammonium nitrate or the like, also causes a decrease in hydroxyl concentration and reduced pH. It makes no difference whether these extraneous ammonium ions are added as ammonium salts or whether they are generated in situ.

It is a critical feature, however, that sufficient extraneous ammonium ions be provided to effect a decrease in the pH of the ammoniacal silver salt solution in order to stabilize the explosion inhibitors of the present invention. Otherwise, the pH will be too high and premature reduction of some of the silver will occur resulting in formation of a silver "mud" and consuming, if not totally depleting, the silver salt available for electroless deposit to metallic silver.

For purposes of the invention, it is preferred to provide sufficient extraneous ammonium ions, generally ranging from between 0.2 to 1.0 moles per liter and preferably about 0.33 moles per liter, to stabilize the explosion inhibitor in the aqueous solution of ammoniacal silver salt and prevent deterioration of the same, which may be accompanied by formation of silver mud. While the resulting pH in the ammoniacal silver salt solution will vary, depending upon the amount of free ammonia provided therein, for a typical solution having 3.5 moles per liter of free ammonia, the pH should be below about pH 11.7 to 11.5. The pH need not be much lower to effectively stabilize the explosion inhibitor and will only result in surplus ammonium ions and reduced commercial economies.

The preferred polyhydric alcohols which have been found to be useful as explosion inhibitors in accordance with the invention are those polyhydric alcohols having between 4 to 6 carbon atoms. These polyhydric alcohols include, but are not limited to, sorbitol and mannitol, which are preferred, as well as arabintol, ribitol and xylitol. However, it is fully within the purview of the present invention that other polyhydric alcohols may be utilized. Furthermore, various known isomers, including stereoisomers, can be utilized as explosion inhibitors in accordance with the present invention.

The ammoniacal silver salts within the purview of the present invention are those silver salts which may be derived from any silver compound that can be complexed with ammonia and which are capable of being reduced to metallic silver to effect electroless deposition of silver on an appropriate surface. Such a surface may be, for example, a glass surface which is sensitized with stannous salts, such as chlorides, fluorides or the like. Most commonly, the silver salts utilized are those which are sufficiently water soluble to provide an aqueous medium and preferably include silver nitrate or salts formed by reacting silver oxide with mineral acids such as sulfuric acid, or with organic acids such as acetic acid, carbonic acid, or oxalic acid to form corresponding sulphates, acetates, carbonates, oxalates and the like.

For purposes of the invention, any strong alkali may be utilized, such as sodium hydroxide, potassium hydroxide, or any like compound, which is a "strong electrolyte" (i.e. a metal salt of Periodic Group IA).

In the preferred embodiment of the present invention, it is particularly advantageous to combine the explosion inhibitor with the concentrated solution of ammoniacal silver salt, because this protects against the formation of explosive conditions or compounds, regardless of the source of strong alkali contamination. This provides an additional safety factor, since during shipment and handling, it is quite possible that the concentrated solution of ammoniacal silver salt may come into contact with a strong alkali from a source other than that intended to be ultimately utilized therewith in a multi-part system for electroless deposition of silver.

Alternatively, in another embodiment of the invention, the explosion inhibitor can be admixed with the strong alkali solution of a multi-part system for electroless deposition of silver. When combined with a strong alkali, the explosion inhibitors of the present invention do not require further stabilization.

In yet a further embodiment of the invention, a portion of the explosion inhibitor can be provided in both the concentrated ammoniacal silver salt and strong alkali solutions.

Furthermore, in accordance with the present invention, an improved multi-part system for electroless deposition of silver upon simultaneous admixture of the two components is provided and is protected against the formation of explosive conditions or compounds, such as fulminating silver. This improved multi-part system preferably comprises the following compositions:

Solution A—a concentrated aqueous silvering solution of ammoniacal silver salt and an explosion inhibitor comprising a polyhydric alcohol having 4 to 6 carbon atoms and sufficient extraneous ammonium ions to stabilize the polyhydric alcohol and prevent deterioration thereof, and Solution B—an aqueous solution of strong alkali.

As an alternative embodiment of the improved multi-part system of the invention, the following combinations may be utilized:

Solution A—a concentrated aqueous silvering solution comprising ammoniacal silver salt, and Solution B—an aqueous solution of strong alkali and an explosion inhibitor of the present invention.

A further embodiment of the multi-part system of the invention may be provided as follows:

Solution A—a concentrated aqueous silvering solution comprising ammoniacal silver salt and a portion of the explosion inhibitor of the present invention together with sufficient extraneous ammonium ions to stabilize the explosion inhibitor and prevent its deterioration, and Solution B—an aqueous solution of strong alkali and a second portion of the explosion inhibitor of the present invention.

In accordance with the present invention, about 10–200 g/l of explosion inhibitors comprising a polyhydric alcohol is utilized to inhibit formation of explosive compounds and conditions upon admixture of concentrated ammoniacal silver salt and strong alkali. If between about 10–60 g/l, and preferably 25–60 g/l, of the explosion inhibitor is used, it is generally necessary to utilize a conventional reducer for the ammoniacal silver salt, so as to achieve a commercially acceptable rate and quality of electroless deposition of silver. Conventional reducers, such as those discussed previously, may either be combined with the concentrated ammoniacal silver salt, or the strong alkali solution, provided of course that such reducers are compatible therewith. If the conventional reducer is not compatible, then it must be added separately in admixture with the ammoniacal silver nitrate and strong alkali components to effect electroless deposition of silver, as is well recognized in the prior art.

However, if between about 60 to 200 g/l of the explosion inhibitor is utilized in accordance with the foregoing, an additional reducer or reducers for the ammoniacal silver salt may not be required, in order to effect deposition of metallic silver upon admixture of the solutions containing ammoniacal silver salt and strong alkali. Although it is not economically advantageous to utilize greater amounts of these polyhydric alcohols, it would be fully within the purview of the present invention to do so. In this case, instead of three only two concentrates contain all the essential chemicals whereby, among other benefits, shipping costs are substantially reduced.

These multi-part silvering systems are utilized by appropriate dilution, generally ranging from 10–50 times below their concentrated strength, and simultaneous admixture of these diluted solutions just before contact with the substrate upon which a metallic silver film is to be applied. The less dilute solutions give a faster rate of deposition and require a shorter reaction time, while the more dilute solutions yield slower rates of deposition and necessitate a longer reaction period.

Simultaneous admixture of these diluted system "parts" may be achieved in a variety of ways known to those skilled in the art. For example, the component solutions may be poured or pumped so that they meet just before contact with the substrate. Alternatively, the component solutions may be air-atomized prior to or simultaneously with intermixing at the surface of the substrate.

A wide variety of optional ingredients may be added to the silvering solutions of the invention for their various known advantages and utilities. For example, conventional additives, such as brighteners, hardeners and retarders may be utilized.

The following examples are intended as further illustrations of the invention, but are not necessarily limited except as set forth in the claims. All parts and percentages are by weight unless otherwise indicated and concentrations are molar, expressed as moles per liter (m/l), unless otherwise specifically indicated.

EXAMPLE 1

A concentrated aqueous solution of ammoniacal silver salt was prepared using 1.47 m/l of silver nitrate and 6.17 m/l of ammonium hydroxide. A concentrated strong alkali solution was prepared using 5.0 m/l of sodium hydroxide and 2.87 m/l of ammonium hydroxide. A series of potentially explosive mixtures were prepared by contacting these concentrated solutions of ammoniacal silver salt and strong alkali in various proportions to provide a 6 cc sample which was subsequently tested for explosion after 48 hours at room temperature. After this period the likelihood of explosion decreases. Each of the various mixtures was placed in a 250 cc Pyrex-type glass beaker, which was then sealed in a plastic bag of the "zip-close" type as an added safety precaution. However, a small slit was provided in the bag to allow a glass or metal rod of approximately ¼ inch in diameter to be inserted. The mixture was then tested after 48 hours by prodding lightly with the rod in an attempt to detonate the same.

Once detonation was achieved, the explosive components would detonate completely, so that further prodding would not produce any further explosion.

In order to evaluate the violence of explosion, an arbitrary Violence Scale was established:

| Violence | Description |
|---|---|
| 0 | No explosion, even after multiple prodding for 5 minutes. |
| 1 | Explodes, but glass vessel not broken and plastic bag not ripped; slight "pop" sound. |
| 2 | Explodes, glass vessel broken, but plastic bag not ripped. |
| 3 | Explodes, glass vessel broken and plastic bag slightly ripped. |
| 4 | Explodes, glass vessel broken and plastic bag ripped about bottom only. |
| 5 | Explodes, glass vessel broken into small fragments, plastic bag extensively ripped by fragments, and substantial noise produced. |

The results of this series of experiments is set forth in Table 1, which indicates final concentrations of the potentially explosive mixtures produced by contacting the concentrated ammoniacal silver nitrate solution and sodium hydroxide solutions, as well as the violence rating produced by attempted detonation.

Table 1

| Volume Ratio Silver: Hydroxide Solutions | Silver Nitrate (m/l) | Ammonium Hydroxide (m/l) | Sodium Hydroxide (m/l) | Explosion Violence Rating |
|---|---|---|---|---|
| 1:21 | 0.06 | 3.01 | 4.97 | 0.5 |
| 1:11 | 0.13 | 3.14 | 4.59 | 1.0 |
| 1:5 | 0.25 | 3.42 | 4.17 | 3.0 |
| 1:2 | 0.49 | 3.97 | 3.33 | 4.0 |
| 1:1 | 0.74 | 4.53 | 2.50 | 5.0 |
| 2:1 | 0.98 | 5.07 | 1.67 | 3.0 |
| 5:1 | 1.22 | 5.67 | 0.83 | 2.0 |
| 11:1 | 1.35 | 5.87 | 0.35 | 0 |
| 21:1 | 1.41 | 6.03 | 0.20 | 0 |

As is indicated in Table 1, explosions occurred at various ratios of concentrated ammoniacal silver nitrate and sodium hydroxide.

EXAMPLE 2

In accordance with the preferred embodiment of the invention, sorbitol was added to the concentrated aqueous solution of ammoniacal silver nitrate, together with ammonium nitrate to provide sufficient extraneous ammonium ions to stabilize the solution, as indicated in Table 2.

Thereafter, the concentrated solutions of ammoniacal silver nitrate into which sorbitol was added as an explosion inhibitor and concentrated solution of sodium hydroxide were admixed to provide potentially explosive mixtures. These mixtures were then tested for explosion potential in the same manner as in Example 1. The results are set forth in Table 2, which indicates that explosion was successfully inhibited in each instance.

Table 2

| Volume Ratio Silver: Hydroxide Solutions | Silver Nitrate (m/l) | Ammonium Hydroxide (m/l) | Sodium Hydroxide (m/l) | Sorbitol (m/l) - (g/l) | | Ammonium Nitrate (m/l) | Explosion Violence Rating |
|---|---|---|---|---|---|---|---|
| 1:5 | 0.25 | 3.42 | 4.17 | 0.05 | 9.6 | 0.05 | 0 |
| 1:2 | 0.49 | 3.97 | 3.33 | 0.11 | 21.0 | 0.10 | 0 |
| 1:1 | 0.74 | 4.53 | 2.50 | 0.17 | 32.5 | 0.16 | 0 |
| 2:1 | 0.98 | 5.07 | 1.67 | 0.22 | 42.1 | 0.21 | 0 |
| 5:1 | 1.22 | 5.67 | 0.83 | 0.28 | 53.5 | 0.26 | 0 |

EXAMPLE 3

Example 2 was repeated substituting mannitol for sorbitol and using exactly the same amounts of all materials for identical combinations of concentrated ammoniacal silver nitrate solution and concentrated sodium hydroxide solution. Again as was set forth in Table 2 for Example 2, the explosion violence in this series of experiments was again zero in all cases, since no explosions occurred.

EXAMPLE 4

A series of potentially explosive mixtures of concentrated ammoniacal silver nitrate and sodium hydroxide solutions was prepared along the same lines as in Examples 2 and 3. However, in accordance with an alternative embodiment of the present invention sorbitol was first combined with the concentrated sodium hydroxide solution, rather than the ammoniacal silver nitrate solution prior to admixture thereof. Once again, the final concentrations of the resulting mixtures were tested for explosion potential. The results are set forth in Table 4.

Table 4

| Volume Ratio Silver: Hydroxide Solutions | Silver Nitrate (m/l) | Sodium Hydroxide (m/l) | Sorbitol (m/l) - (g/l) | | Explosion Violence Rating |
|---|---|---|---|---|---|
| 1:5 | 0.25 | 4.17 | 0.28 | 53.5 | 0 |
| 1:2 | 0.49 | 3.33 | 0.22 | 42.1 | 0 |
| 1:1 | 0.74 | 2.50 | 0.17 | 32.5 | 0 |
| 2:1 | 0.98 | 1.67 | 0.11 | 21.0 | 0 |
| 5:1 | 1.22 | 0.83 | 0.05 | 9.6 | 0 |

EXAMPLE 5

Example 4 was repeated substituting mannitol for sorbitol as the explosion inhibitor, again providing the same in the concentrated solution of sodium hydroxide, prior to admixture with the concentrated solution of ammoniacal silver nitrate. The same series of reactive mixtures was prepared as in Example 4 and once again the value Explosion Violence Rating was zero in all cases, as no explosions could be produced.

EXAMPLE 6

A two-part silvering system for deposition of metallic silver on a glass surface was prepared using sorbitol as the explosion inhibitor of the invention, combined with the concentrated solution of ammoniacal silver nitrate.

First, a concentrated aqueous solution containing 250 grams/liter (g/l) (1.47 m/l) of silver nitrate and 417 cc/liter (6.17 m/l) of 28% ammonium hydroxide was prepared. To this solution 60 g/l (0.31 m/l) of sorbitol and 25 g/l (0.31 m/l) of ammonium nitrate were added in accordance with the invention.

A second solution was prepared containing 200 g/l (5.0 m/l) of sodium hydroxide and 195 cc/l (2.87 m/l) of 28% ammonium hydroxide. Each of these concentrated solutions was diluted equally about 25 times with water prior to use. In normal industrial applications, each of these concentrated solutions are diluted between 10–50 times with water prior to use. The diluted solutions were then fed through separate nozzles which were directed so as to provide admixture of the materials in spray form upon a glass surface, which was passed through the spray and thereby deposited with a film of metallic silver.

EXAMPLE 7

A two-part silvering system for deposition of metallic silver on a glass surface was prepared using sorbitol as the explosion inhibitor of the invention, combined with the concentrated aqueous solution of caustic.

A concentrated aqueous solution of ammoniacal silver nitrate was prepared by admixing 250 g/l (1.47 m/l) of silver nitrate and 417 cc/l (6.17 m/l) of 28% ammonium hydroxide. A concentrated aqueous caustic solution was prepared by admixing 200 g/l (5.0 m/l) of sodium hydroxide, 195 cc/l (2.87 m/l) of 28% ammonium hydroxide and 60 g/l (0.31 m/l) of sorbitol.

Each of these concentrated solutions was diluted equally about 25 times with water prior to use and then fed through separate nozzles which were directed so as to provide admixture thereof in spray form upon a glass surface which was passed through the spray. A reflective silver film was deposited on the glass surface.

EXAMPLE 8

A three-part silvering system for deposition of metallic silver on a glass surface was prepared in which sorbitol was utilized as the explosion inhibitor of the invention and a conventional reducer; namely, dextrose, was used to effect deposition at an acceptable commercial rate.

A first concentrated aqueous solution was prepared by admixture of 250 g/l (1.47 m/l) of silver nitrate, 417 cc/l (6.17 m/l) of 28% ammonium hydroxide, 25 g/l (0.13 m/l) of sorbitol and 25 g/l (0.31 m/l) of ammonium nitrate in water.

A second concentrated aqueous solution was prepared by admixture in water of 200 g/l (5.0 m/l) of sodium hydroxide and 195 cc/l (2.87 m/l) of 28% ammonium hydroxide.

A third concentrated aqueous solution of 100 g/l (0.56 m/l) of dextrose in water was also prepared. Invert sugar can be substituted for the dextrose, if desired.

Each of these concentrated solutions was then diluted equally about 25 times with water prior to use. The three diluted solutions were fed through separate nozzles directed so as to provide admixture of the solutions in a spray applied to the glass surface to be coated. As the glass surface was passed through the spray, a reflective silver film was deposited thereupon.

EXAMPLE 9

A three-part silvering system similar to that set forth in Example 8 was prepared. However, the first concentrated aqueous solution was prepared by admixture of 25 g/l (1.47 m/l) of silver nitrate and 417 cc/l (6.17 m/l) of 28% ammonium hydroxide in water. The second concentrated aqueous solution was prepared by admixture of 200 g/l (5.0 m/l) of sodium hydroxide, 195 cc/l (2.87 m/l) of 28% ammonium hydroxide and 25 g/l (0.13 m/l) of sorbitol in water. The third concentrated solution was prepared as in Example 8, above.

These three solutions were then diluted and applied as in Example 8 and a reflective film of silver was deposited on the target glass surface.

It will this be seen that the objects set forth above, among those made apparent in the preceding description and exhibits, are efficiently attained. Furthermore, since certain changes may be made in providing the above compositions and in carrying out the above methods without departing from the spirit and scope of the invention, it is intended that all matter contained in the above description shall be interpretive as illustrative and not limiting.

What is claimed is:

1. An improved method for inhibiting formation of explosive conditions or compounds in a mixture resulting from contact of (1) a concentrated aqueous solution of an ammonical silver salt and (2) a concentrated aqueous solution of a strong alkali, which comprises providing an effective amount of an explosion inhibitor comprising a polyhydric alcohol having 4 to 6 carbon atoms in at least one of said concentrated aqueous solutions (1) or (2).

2. The method of claim 1 wherein said ammoniacal silver salt is ammoniacal silver nitrate, said strong alkali is sodium hydroxide and said polyhydric alcohol is selected from the group consisting of sorbitol, mannitol, arabintol, ribitol and xylitol.

3. The method of claim 1 wherein the total amount of said polyhydric alcohol provided is in a range of 25–60 g/l and an amount of conventional reducer sufficient to facilitate subsequent electroless plating of silver upon contact with said aqueous solution of strong alkali is also included with at least one of said concentrated aqueous solutions (1) or (2), provided said conventional reducer is compatible therewith.

4. The method of claim 1 wherein said explosion inhibitor is provided in said concentrated aqueous solution of ammonical silver salt and sufficient extraneous ammonium ions are also provided in said concentrated aqueous solution to stabilize said explosion inhibitor.

5. The method of claim 4 wherein said extraneous ammonium ions are provided by addition of ammonium nitrate to said aqueous solution of ammoniacal silver salt.

6. The method of claim 5 wherein said polyhydric alcohol is selected from sorbitol or mannitol provided in the range of 25–200 g/l and said ammonium nitrate is provided in a range of 10–200 g/l.

7. The method of claim 5 wherein said polyhydric alcohol is selected from sorbitol or mannitol and is provided in a range of 60–200 g/l and said ammonium nitrate is provided in a range of 16–80 g/l.

8. The method of claim 5 wherein polyhydric alcohol is selected from sorbitol or mannitol provided in a range of 25–200 g/l and said extraneous ammonium ions are selected from citric acid or ammonium citrate provided in a range of 5–100 g/l.

9. The method of claim 5 wherein said polyhydric alcohol is selected from sorbitol or mannitol provided in a range of 60–200 g/l and said extraneous ammonium ions are selected from citric acid or ammonium citrate provided in a range of 5–20 g/l.

10. The method of claim 5 wherein said extraneous ammonium ions are provided by addition to said concentrated aqueous solution of ammoniacal silver nitrate of an effective amount of ammonium citrate, citric acid, or a mineral acid compatible with said ammoniacal silver nitrate, whereby said extraneous ammonium ions required to stabilize said polyhydric alcohol are generated in situ.

11. The method of claim 1 wherein said explosion inhibitor is admixed with said concentrated aqueous solution of strong alkali.

12. The method of claim 1 wherein said explosion inhibitor is provided in both of said concentrated aqueous solutions of ammonical silver salt and strong alkali.

13. An improved multi-part system capable of effecting electroless deposition of silver by simultaneous admixture of diluted portions thereof on a work surface and protected against formation of explosive compounds or conditions in a mixture resulting from contacting the system parts, said system comprising the following parts:

(A) a concentrated aqueous silvering solution comprising ammonical silver salt, an effective amount of explosion inhibitor comprising a polyhydric alcohol having 4 to 6 carbon atoms and sufficient extraneous ammonium ions to stabilize said polyhydric alcohol in said aqueous silvering solution and thereby prevent deterioration of the same, and (B) a concentrated aqueous solution of strong alkali.

14. The system of claim 13 wherein a conventional reducer for said ammoniacal silver salt is included in at least one of said solutions A or B provided said conventional reducer is compatible therewith, said conventional reducer being included in an amount effective to improve depositions of metallic silver on said work surface upon admixture of solutions A and B.

15. The improved multi-part silvering system of claim 14 wherein said polyhydric alcohol is provided in a preferred range of 25–60 g/l.

16. The improved multi-part silvering system of claim 13 wherein said ammoniacal silver salt is ammoniacal silver nitrate, said polyhydric alcohol is selected from sorbitol, mannitol, arabintol, ribitol and xylitol and said extraneous ammonium ions are provided in said solution A by (1) addition of ammonium nitrate or ammonium citrate, or (2) by generation of said extraneous ammonium ions in situ by addition of citric acid, or mineral acids compatible with said ammoniacal silver salt.

17. An improved multi-part system capable of effecting electroless deposition of silver by simultaneous admixture of diluted portions thereof on a work surface and protected against formation of explosive compounds and conditions in a mixture resulting from contacting the system parts, said system comprising the following parts:

(A) a concentrated aqueous silvering solution comprising ammonical silver salt, and (B) a concentrated aqueous solution of strong alkali and an effective amount of an explosion inhibitor comprising a polyhydric alcohol having 4 to 6 carbon atoms.

18. The improved multi-part system of claim 17 wherein a conventional reducer for said ammoniacal silver salt is included in at least one of said solutions A or B, provided said reducer is compatible therewith, said conventional reducer being included in an amount effective to improve deposition of metallic silver on said work surface upon admixture of solutions A and B.

19. The improved multi-part silvering system of claim 18 wherein said polyhydric alcohol is provided in a preferred range of 25–60 g/l.

20. The improved multi-part system of claim 17 wherein said ammoniacal silver salt is ammoniacal silver nitrate, said polyhydric alcohol is selected from sorbitol, mannitol, arabintol, ribitol and xylitol and said extraneous ammonium ions are provided in said solution A by (1) addition of ammonium nitrate or ammonium citrate, or (2) by generation of said extraneous ammonium ions in situ by addition of citric acid, or mineral acids compatible with said ammoniacal silver salt.

21. The improved multi-part silvering system of claim 20 wherein said ammonical silver nitrate is provided in the range of 100–500 g/l of silver nitrate, said polyhydric alcohol is provided in the range of 25–200 g/l, said ammonium nitrate is provided in the range of 10–200 g/l and said citric acid is provided in the range of 5–100 g/l.

22. An improved multi-part system capable of effecting electroless deposition of silver by simultaneous admixture of dilute portions thereof on a work surface and protected against formation of explosive compounds and conditions in a mixture resulting from contacting the system parts, said system comprising the following parts:

(A) a concentrated aqueous silvering solution comprising ammonical silver salt, a first portion of an explosion inhibitor comprising a polyhydric alcohol having 4 to 6 carbon atoms and sufficient extraneous ammonium ions to stabilize said polyhydric alcohol in said aqueous silvering solution and thereby prevent deterioration of the same, and (B) a concentrated aqueous solution of strong alkali and a second portion of said explosion inhibitor; wherein the total amount of said explosion inhibitor would be effective to inhibit formation of explosive compounds of conditions in a mixture resulting from contacting compositions (A) and (B).

23. The system of claim 22 wherein a conventional reducer for said ammoniacal silver salt is included in at least one of said solutions A or B, provided said reducer is compatible therewith, said conventional reducer being included in an amount effective to improve deposition of metallic silver on said work surface upon admixture of solutions A and B.

24. The improved multi-part silvering system of claim 23 wherein said polyhydric alcohol is provided in a preferred range of 25–60 g/l.

25. The improved multi-part silvering system of claim 22 wherein said ammoniacal silver salt is ammoniacal silver. nitrate, said polyhydric alcohol is selected from sorbitol, mannitol, arabintol, ribitol and xylitol and said extraneous ammonium ions are provided in said solution A by (1) addition of ammonium nitrate or ammonium citrate, or (2) by generation of said extraneous ammonium ions in situ by addition of citric acid, or mineral acids compatible with said ammoniacal silver salt.

26. The improved multi-part silvering system of claim 25 wherein said ammoniacal silver nitrate is provided in the range of 100–500 g/l of silver nitrate, said polyhydric alcohol is provided in the range of 25–200 g/l, said ammonium nitrate is provided in the range of 10–200 g/l and said citric acid is provided in the range of 5–100 g/l.

27. The system of claim 13 wherein said conventional reducer is not compatible with said solutions A and said solution B and is provided in a separate solution C which is simultaneously admixed with both of said solutions A or B.

28. The improved multi-part system of claim 18 wherein said conventional reducer is not compatible with said solution A and said solution B and is provided in a separate solution C which is simultaneously admixed with both of said solutions A or B.

29. The improved multi-part silvering system of claim 20 wherein said ammoniacal silver nitrate is provided in the range of 100–500 g/l of silver nitrate, said polyhydric alcohol is provided in a range of 60–200 g/l, said ammonium nitrate is provided in a range of 16–80 g/l and said citric acid is provided in the range of 5–20 g/l.

30. The system of claim 22 wherein said conventional reducer is not compatible with said solution A and said solution B and is provided in a separate solution C which is simultaneously admixed with both of said solutions A or B.

31. The improved multi-part silvering system of claim 25 wherein said ammoniacal silver nitrate is provided in the range of 100–500 g/l of silver nitrate, said polyhydric alcohol is provided in the range of 60–200 g/l, said ammonium nitrate is provided in the range of 16–80 g/l and said citric acid is provided in the range of 5–20 g/l.

* * * * *